(12) United States Patent
Tong et al.

(10) Patent No.: US 6,529,741 B1
(45) Date of Patent: *Mar. 4, 2003

(54) MULTI-BIT POWER CONTROL AND POWER CONTROL COMMAND SUB-CHANNEL DESIGN

(75) Inventors: Wen Tong, Ottawa (CA); Evelyn Le Strat, Paris (FR)

(73) Assignee: Nortel Networks Ltd., St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/293,540

(22) Filed: Apr. 16, 1999

(51) Int. Cl.[7] ............................ H04Q 7/20; H04B 7/185
(52) U.S. Cl. ........................ 455/522; 455/13.4; 370/318
(58) Field of Search ............................ 455/68, 69, 70, 455/522, 127, 13.4; 370/342, 318, 320, 468; 375/244, 312, 329, 330, 308

(56) References Cited

U.S. PATENT DOCUMENTS

| | | | | | |
|---|---|---|---|---|---|
| 5,107,487 A | * | 4/1992 | Vilmur et al. | ............... | 370/342 |
| 5,883,899 A | * | 3/1999 | Dahlman et al. | ........... | 370/468 |
| 5,982,760 A | * | 11/1999 | Chen | ........................ | 455/522 |
| 6,034,952 A | * | 3/2000 | Dohi et al. | .................. | 455/522 |
| 6,081,727 A | * | 6/2000 | Kondo | ........................ | 455/522 |
| 6,128,506 A | * | 10/2000 | Knutsson et al. | ............ | 455/522 |
| 6,151,508 A | * | 11/2000 | Kim et al. | .................. | 455/522 |
| 6,163,707 A | * | 12/2000 | Miller | ........................ | 455/522 |
| 6,233,439 B1 | * | 5/2001 | Jalali | ........................ | 455/522 |
| 6,295,289 B1 | * | 9/2001 | Ionescu et al. | ............. | 455/522 |
| 6,311,070 B1 | * | 10/2001 | Tong et al. | .................. | 455/522 |

\* cited by examiner

*Primary Examiner*—Tracy Legree
(74) *Attorney, Agent, or Firm*—Bruce Garlick

(57) ABSTRACT

The invention provides a system and method for controlling transmission power of a mobile unit in a wireless communication system which minimizes transmission power overshoot caused by counteracting the effects of deep fading. Sets of power control bits are transmitted from the base station to the mobile unit using π/4 DQPSK modulation. A first set of the bits indicates to the mobile unit a request to increase the mobile units transmission power by a predetermined amount. A second set of the bits indicates to the mobile unit that the mobile unit should increase its transmission power by an amount which is greater than the predetermined amount. A third set of the bits indicates to the mobile unit a request to decrease the mobile units transmission power by the predetermined amount. A fourth set of the bits indicates to the mobile unit that the mobile unit should decrease its transmission power by the amount which is greater than the predetermined amount.

23 Claims, 4 Drawing Sheets

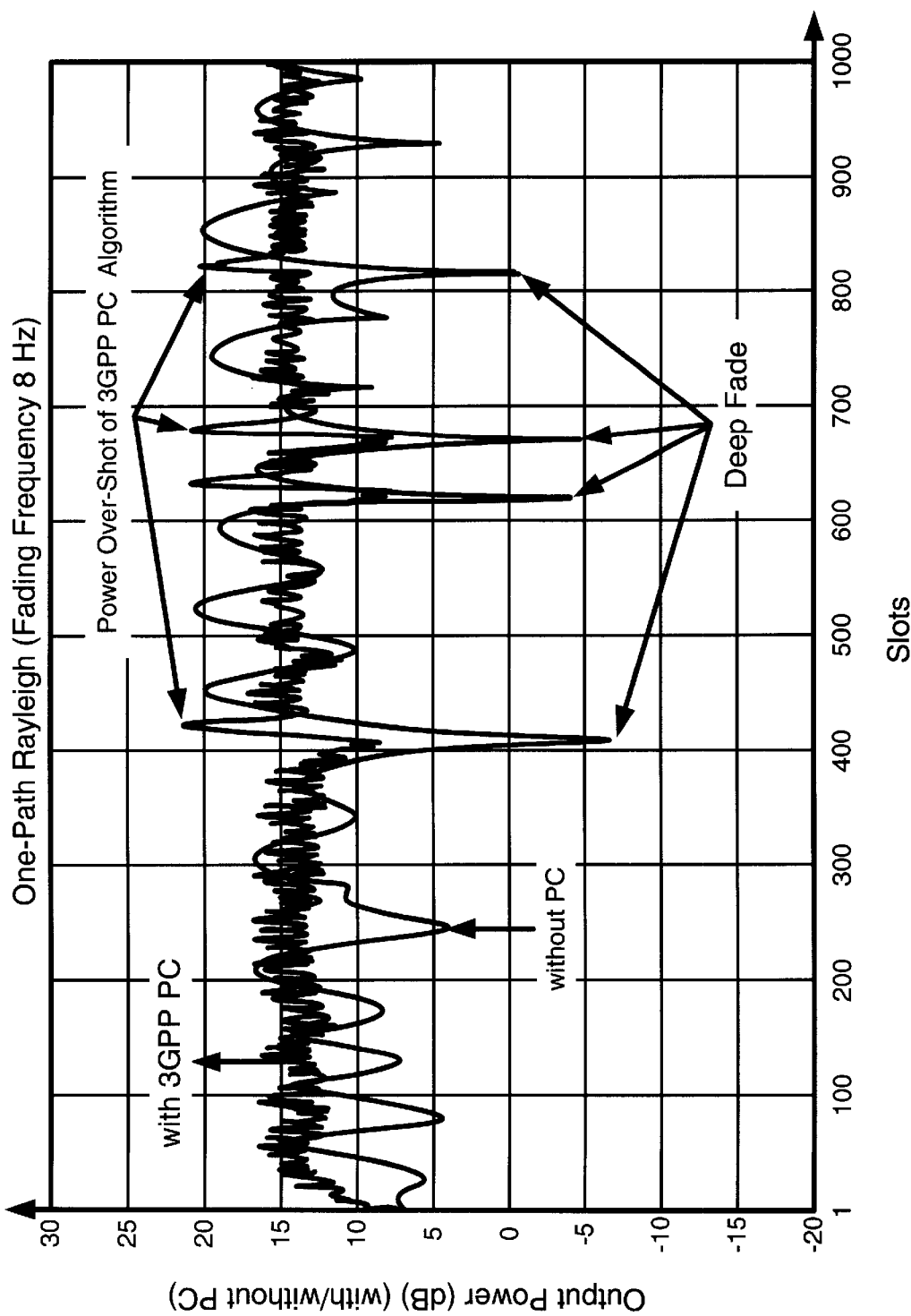

MULTI-BIT POWER CONTROL AND POWER CONTROL COMMAND SUB-CHANNEL DESIGN

CROSS-REFERENCE TO RELATED APPLICATION

The present application claims priority pursuant to 35 U.S.C. Sec. 120 to U.S. patent application Ser. No. 09/273,411, filed Mar. 22, 1999, now issued as U.S. Pat. No. 6,311,070, which is hereby incorporated herein by reference in its entirety.

FIELD OF THE INVENTION

This invention relates generally to the field of wireless communications systems and more particularly to transmitting power control bits over a Differential Quadriture Phase Shift Keying (DQPSK) modulated sub-channel and varying the step size of power control to protect against transmit power overshoot in Code Division Multiple Access (CDMA) communications systems.

BACKGROUND OF THE INVENTION

In CDMA communications systems, maximum uplink capacity is achieved when the power level of signals received by the Base Transceiver Subsystem (BTS) is the same for all mobile users. Such a power level is called the "nominal power level." If this nominal power level is maintained regardless of the distance between the base station and the mobile unit and regardless of the signal propagation environment then maximum uplink capacity is maintained.

If the power level of a signal received from a mobile unit drops below the nominal level, the error probability for that user increases. If the power level of a signal received from a mobile unit exceeds the nominal level, the probability that the signal will interfere with signals from other mobile units increases. Thus transmission power deviations from the nominal power level decrease the capacity of the system.

Rayleigh fading is a problem which introduces a fast power deviation from the nominal power level and thus degrades system capacity.

In current Third Generation Partner Project (3GPP) systems, power control mechanisms are being employed which attempt to equalize the received power of the signal from the mobile unit and to compensate for fast power deviations from the nominal power level caused by the impact of Rayleigh fading.

The overall uplink power control for 3GPP is shown in FIG. 1. The BTS employs a Rake receiver to receive and demodulate a desired signal. It then determines a signal to noise ratio (SNR) of the received signal using SNR estimation. The BTS then compares the determined SNR to the nominal power level to generate a power control bit (PCB). Typically power control is only concerned with a single bit wherein a 1 indicates to the mobile unit to increase transmission power and a 0 indicates to the mobile unit to decrease transmission power. The PCB is multiplexed with data and transmitted to the mobile unit as a Transmit Power Control (TPC) signal (FIG. 2). The mobile unit receives the TPC signal, demodulates it, and separates the PCB (demultiplexes it). The mobile unit then converts the PCB to a power transmission gain (positive or negative) of the output power in the Extract PCB and Convert to Power Step Size block. This is considered closed loop power control.

There are also methods in 3GPP considered outer loop power control. In outer loop power control systems, the BTS adjusts the nominal power level based upon a Frame Error Rate (FER) probability for a particular nominal power level. The BTS measures the FER probability and determines a SNR threshold. If at the output of the Viterbi decoder, the FER is high, the nominal power level is increased. If the FER is low, the nominal power level is decreased. A system may employ one or both of these two methods.

Channel fading without power control leads to a standard deviation of 5.5 dB for all fading frequencies. However, due to deep fades of a desired signal, the standard deviation may decrease more than 20 dB with respect to the required signal level. This leads to the increase of the error probability for a particular mobile unit.

Based on the current 3GPP specification, closed loop power control results in a considerable reduction of SNR deviation for small fading frequencies (e.g. in the range of 8–15 Hz). However, the efficiency is greatly decreased when the fading frequency is above 30 Hz. This is because of the conventional fixed power control steps of 0.25 dB, 0.5 dB and/or 1 dB and the delay (at least one slot of power control bit command) which are not able to track the changes of the signal power in the channel in fast fading environments. For the same reasons large power overshooting (i.e. too many increases or decreases to the transmission power in the mobile unit) occurs at the BTS input for all fading frequencies.

Conventional 3GPP systems operate with a fixed power control step size (e.g. 1 dB) and a fixed power control command transmission delay. When a signal from a mobile unit experiences a deep fade, the BTS sends consecutive power increasing commands to the mobile unit. The mobile unit receives these commands and increases its transmission power to compensate for the deep fading. However the mobile unit continues to increase its power even after the deep fade period ends, due to the power control command transmission delay. This continued increase in power causes the power overshoot (see FIG. 2). Power overshooting negatively impacts the uplink power control performance by increasing the standard deviation of power control for the particular mobile unit and increasing the overall interference experienced by transmissions to the BTS. Power overshooting has been observed to be as high as 5 dB and has been known to occur at all fading frequencies.

One attempted solution to this problem has been to modulate the amplitude of the PCB. A larger than usual PCB amplitude would indicate a larger than usual step size for increasing or decreasing the transmission power of the mobile unit while a smaller than usual PCB amplitude would indicate a smaller than usual step size. (See FIGS. 3a and 3b). The step size is directly proportional to the amplitude. However, accurate detection of the amplitude modulated PCB is difficult and unreliable due to the nature of the channel (i.e. noise).

Accordingly, there exists a need for a more reliable power control system which minimizes power overshoot.

There also exists a need for a power control system which maximizes uplink capacity.

There exists a need for a power control system which minimizes standard deviation from the nominal power level.

Accordingly, it is an object of the present invention to provide a more reliable power control system which minimizes power overshoot.

It is another object of the invention to provide a power control system which minimizes the standard deviation from the nominal power level.

It is still another object of the invention to provide a power control system which employs a variable step size.

These and other objects of the invention will become apparent to those skilled in the art from the following description thereof.

SUMMARY OF THE INVENTION

In accordance with the teachings of the present invention, these and other objects may be accomplished by the present invention, which provides transmission power control of a mobile unit in a wireless communication system.

An embodiment of the invention provides a method of controlling transmission power of a mobile unit in a wireless communication system which includes the mobile unit receiving a multiple power control bits. The mobile unit increases its transmission power by a predetermined amount in response to receipt of one set of the power control bits, and increases its transmission power by an amount which is larger than the predetermined amount in response to receipt of another set of the power control bits.

Another embodiment of the invention provides a method of controlling transmission power of a mobile unit including a base station transmitting multiple power control bits. A first set of the plurality of power control bits indicates a request to increase a transmission power by a predetermined amount, and another set of the power control bits indicates a request to increase the transmission power by an amount which is larger than the predetermined amount.

In another embodiment of the invention, a system is provided for controlling transmission power of a mobile unit in a wireless communication system. The system includes a mobile unit which includes a module for receiving groups of power control bits. A first set of the plurality of power control bits indicates that the transmission power should be increased by a predetermined amount. Another set of the power control bits indicates that the transmission power should be increased by an amount which is greater than the predetermined amount. The system further includes a module for increasing the transmission power by the predetermined amount in response to receiving the first set of power control bits and, a module for increasing the transmission power by the amount which is greater than the predetermined amount in response to receiving the another set of power control bits.

In still another embodiment, the invention provides an apparatus for controlling transmission power of a mobile unit in a wireless communication system which includes a receiver configured to receive groups of power control bits. It also includes a DQPSK detector connected to the receiver. The apparatus includes a demodulator connected to the receiver, a demultiplexor connected to the demodulator, configured to separate the power control bits from the transmit power control signals. The apparatus includes a processor connected to the demultiplexor; configured to determine if a set of power control bits indicates increasing the transmission power by a predetermined amount, increasing the transmission power by an amount which is larger than the predetermined amount, decreasing the transmission power by the predetermined amount, or decreasing the transmission power by the amount which is greater than the predetermined amount.

Another embodiment of the invention includes an apparatus for controlling transmission power of a mobile unit in a wireless communication system including a base station. the base station includes a transmitter configured to transmit sets of power control bits. It also includes a DQPSK modulator connected to the transmitter. A first set of the power control bits indicates a request to increase the transmission power by a predetermined amount. A second set of the power control bits indicates a request to increase the transmission power by an amount which is greater than the predetermined amount. A third set of the power control bits indicates a request to decrease the transmission power by the predetermined amount and, a fourth set of the power control bits indicates a request to decrease the transmission power by the amount which is greater than the predetermined amount.

BRIEF DESCRIPTION OF THE DRAWINGS

The invention will be more clearly understood by reference to the following detailed description of an exemplary embodiment in conjunction with the accompanying drawings, in which:

FIG. 2 illustrates deep fading and the resulting power overshoot in 3GPP systems;

DETAILED DESCRIPTION OF THE INVENTION

The invention provides a system and method of power control in a CDMA communication system, which minimizes power overshooting caused by deep fade compensation. The system employs a Differential Quadriture Phase Shift Keying (DQPSK) modulated sub-channel for communicating power control bits (PCB). An advantage of DQPSK is that it is more reliable than the conventional TPC sub-channel and it allows multiple bits to be employed for power control.

Figure 4B:
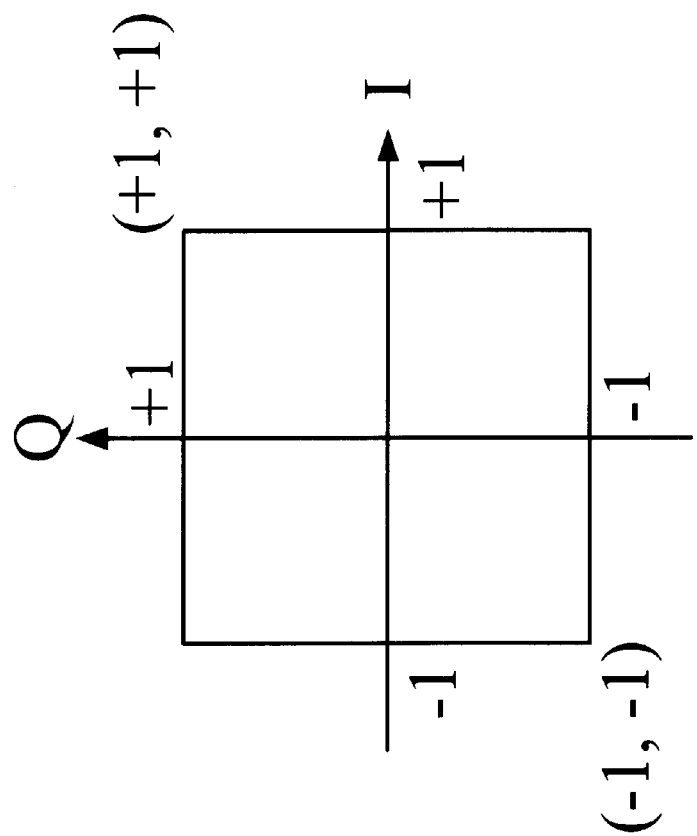
FIG. 4b illustrates a graphical representation of two power control bits transmitted over a Differential Quadriture Phase Shift Keying modulated sub-channel.
Figure 4A:
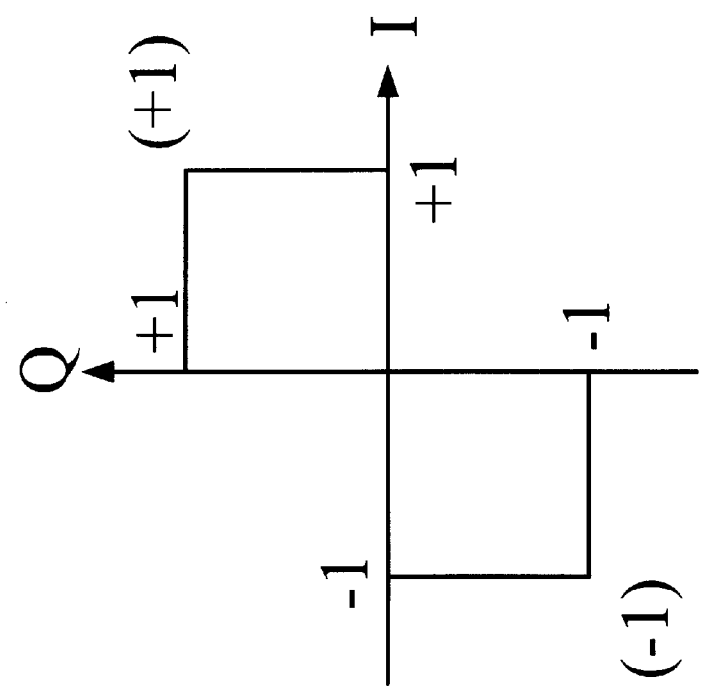
FIG. 4a illustrates a graphical representation of single power control bits transmitted over a Differential Quadriture Phase Shift Keying modulated sub-channel.

FIG. 4a illustrates a graphical representation of a single PCB communicated over a DQPSK modulated sub-channel. This single bit may be employed to operate in the conventional manner of controlling the transmission power of the mobile unit (i.e. a +1 indicates that the remote user should increase the transmission power by a particular step size and a −1 indicates that the remote user should decrease the transmission power by the particular step size). It may also be employed in the manner disclosed in my copending patent application Ser. No. 09/273,411 which is hereby incorporated by reference.

FIG. 4b illustrates that a second PCB can be employed to indicate that the remote user should increase or decrease the transmission power by a larger step size. While only two bits will be discussed herein, it is possible to employ more than two bits to allow for additional step sizes. In a preferred embodiment, the particular step size is 0.25 dB and the larger step size is 1.5 dB. Those skilled in the art will recognize that these numbers are merely set forth as exemplary (i.e. these are merely design choices) and that other step sizes may be employed for different results. Further, the ratio of the step sizes (i.e. 6 to 1) may also be changed to suit a particular system.

The following rules may be employed to determine which step size the base station will request.

Set two threshold values for the system such that: Threshold 1 is the out-loop power control target QoS and Threshold 2 is the instant Signal to Interference Ratio (SIR) (the preferred but not required value of Threshold 2 is 2 dB).

If SIR>Threshold 1 and SIR<Threshold 1+Threshold 2 then increase transmission power by $\Delta P_1$ If SIR>Threshold 1 and SIR>Threshold 1+Threshold 2 then increase transmission power by $\Delta P_2$ If SIR<Threshold 1 and SIR>Threshold 1−Threshold 2 then decrease transmission power by $\Delta P_1$ If SIR<Threshold 1 and SIR<Threshold 1−Threshold 2 then decrease transmission power by $\Delta P_2$.

The base station may communicate this information to the remote unit as shown in the following table:

| One Step Size | | Two Step Size | |
| --- | --- | --- | --- |
| | $\{I,Q\}b_1b_0$ | | $\{I,Q\}b_1b_0$ |
| Increase by $\Delta P_1$ | +1, +1 | Increase by $\Delta P_1$ | +1, +1 |
| Decrease by $\Delta P1$ | −1, −1 | Decrease by $\Delta P_1$ | −1, −1 |
| | | Increase by $\Delta P_2$ | −1, +1 |
| | | Decrease by $\Delta P_2$ | +1, −1 |

Those skilled in the art will recognize that while each bit has been provided with a specific meaning (i.e.+1,+1 increase by $\Delta P_1$,31 1, +1 increase by $\Delta P_2$, etc.) a system could be designed which rearranges the definitions associated with the different bits (i.e.+1,+1 increase by $\Delta P_2$, −1, +1 increase by $\Delta P_1$, or any other rearrangement of the meanings) and still fall within the scope of the invention.

The invention preferably employs $\pi/4$ DQPSK modulation (although other forms of modulation could be employed). The system also employs the following equations for transmitting the TPCs.

$$I_k = I_{k-1} \cos[\Delta\Phi(b_0, b_1)] - Q_{k-1} \sin[\Delta\Phi(b_0, b_1)]$$

$$Q_k = I_{k-1} \sin[\Delta\Phi(b_0, b_1)] + Q_{k-1} \cos[\Delta\Phi(b_0, b_1)]$$

where: k=time, $b_0$, $b_1$ are the TPC bits and

| $b_0$ | $b_1$ | $\Delta\Phi$ |
| --- | --- | --- |
| 1 | 1 | $-3\pi/4$ |
| 0 | 1 | $3\pi/4$ |
| 1 | 0 | $\pi/4$ |
| 0 | 0 | $-\pi/4$ |

Figure 1:
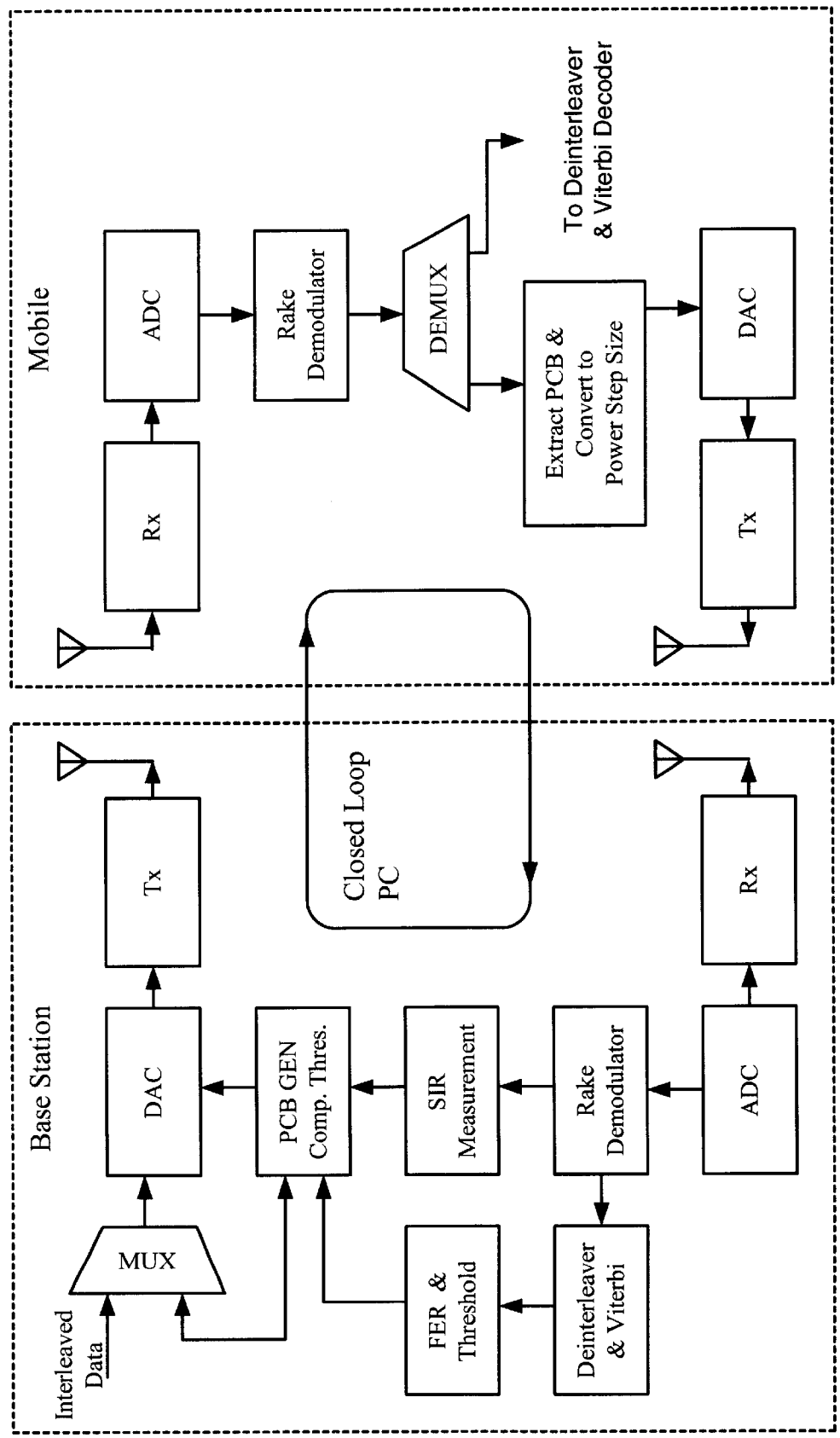
FIG. 1 illustrates a conventional closed loop power control system employed by 3GPP systems.
Figure 3A:
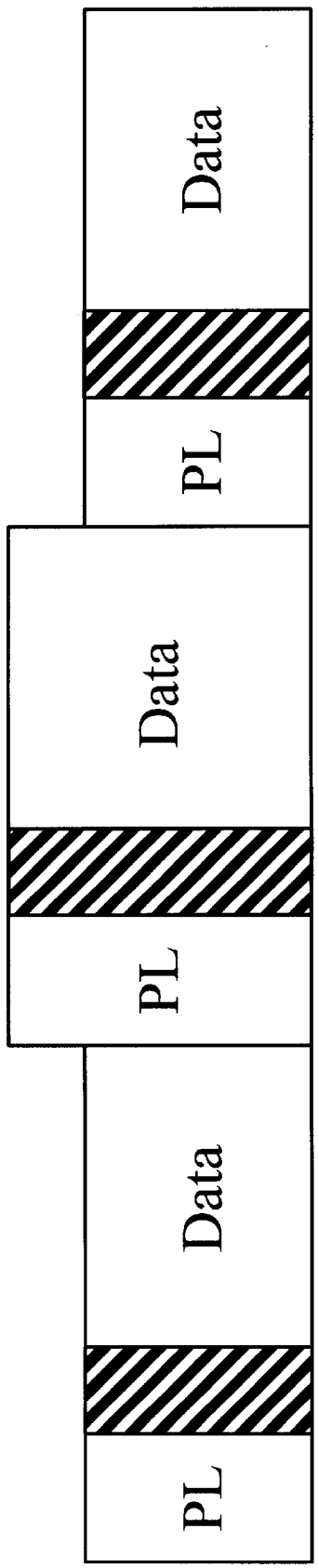
FIG. 3a illustrates conventional transmission power control.
Figure 3B:
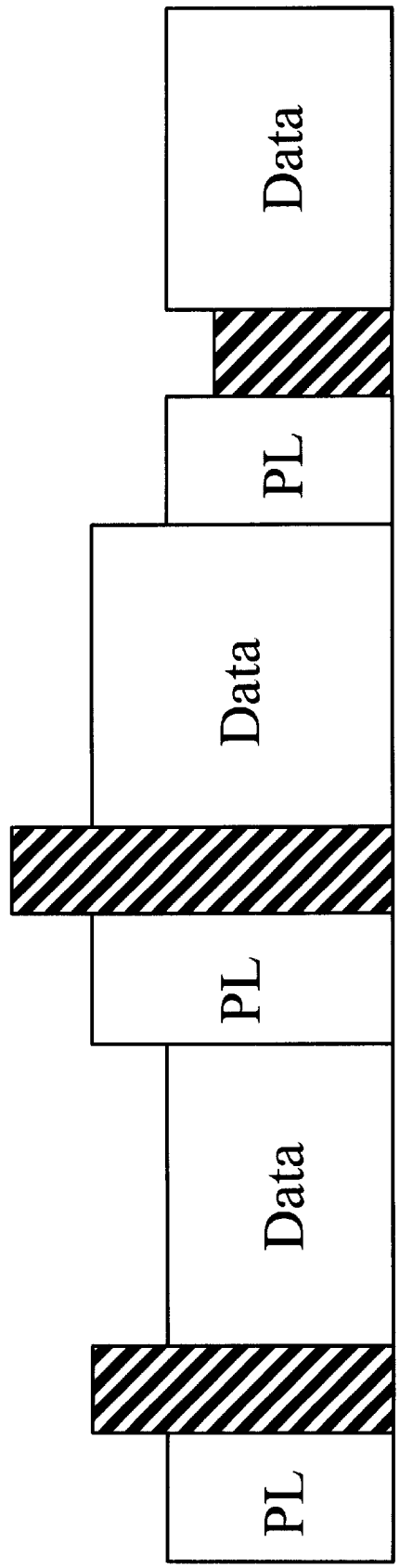
FIG. 3b illustrates conventional transmission power control with amplitude modulated power control bits.

The invention may employ the circuit illustrated in FIG. 1 with the addition of a DQPSK modulator in the base station transmitter and a DQPSK detector and modulator in the mobile units receiver. One or more of the elements of FIG. 1 could be realized as the same or different microprocessors or as some other device such as an application-specific integrated circuit (ASIC), programmable logic array (PLA), or another suitable logic device. They can also be realized in software.

While the invention has been described with respect to a particular rule base, other rules can be applied to achieve similar results. For example, the number of thresholds may be changed, the rules may be based upon some other Quality of Service (QoS) indication other than SIR, and/or the requirements for employing the larger step size may be increased or decreased for varying results.

It will thus be seen that the invention efficiently attains the objects set forth above, among those made apparent from the preceding description. In particular, the invention provides methods and apparatus for transmitting power control bits for adjusting the transmission power of a mobile unit based thereon to minimize power overshoot. Those skilled in the art will appreciate that the configuration depicted in FIGS. 1 and 4 provides such features.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A method of controlling transmission power of a mobile unit in a wireless communication system comprising:
   said mobile unit receiving a plurality of power control bits;
   said mobile unit increasing a transmission power by a predetermined amount in response to receipt of one set of said plurality of power control bits, and
   said mobile unit increasing said transmission power by an amount which is larger than said predetermined amount in response to receipt of another set of said plurality of power control bits.

2. A method of controlling transmission power of a mobile unit according to claim 1 wherein said one set of said plurality of power control bits comprises two bits and said another set of said plurality of power control bits comprises two bits.

3. A method of controlling transmission power of a mobile unit according to claim 2 wherein said predetermined amount comprises 0.25 dB and wherein said amount which is larger than said predetermined amount comprises 1.5 dB.

4. A method of controlling transmission power of a mobile unit according to claim 1 further comprising:
   said mobile unit decreasing said transmission power by said predetermined amount in response to receipt of a third set of said plurality of power control bits, and
   said mobile unit decreasing said transmission power by said amount which is larger than said predetermined amount in response to receipt of a fourth set of said plurality of power control bits.

5. A method of controlling transmission power of a mobile unit according to claim 1 wherein said plurality of power control bits are received over a Differential Quadriture Phase Shift Keying modulated sub-channel.

6. A method of controlling transmission power of a mobile unit comprising:
   a base station transmitting a plurality of power control bits;
   wherein a first set of said plurality of power control bits indicates a request to increase a transmission power by a predetermined amount; and
   wherein another set of said plurality of power control bits indicates a request to increase a transmission power by an amount which is larger than said predetermined amount.

7. A method of controlling transmission power of a mobile unit according to claim 6
   wherein a third set of said plurality of power control bits indicates a request to decrease said transmission power by said predetermined amount; and wherein a fourth set of said plurality of power control bits indicates a request to decrease said transmission power by said amount which is larger than said predetermined amount.

8. A method of controlling transmission power of a mobile unit according to claim 7 wherein said predetermined amount comprises 0.25 dB and wherein said amount which is larger than said predetermined amount comprises 1.5 dB.

9. A method of controlling transmission power of a mobile unit according to claim 6 further comprising:
  said base station employing Differential Quadriture Phase Shift Keying modulation to transmit said plurality of power control bits.

10. A method of controlling transmission power of a mobile unit according to claim 6 wherein each of said sets of said plurality of power control bits comprises two bits.

11. A system for controlling transmission power of a mobile unit in a wireless communication system comprising:
  a mobile unit including:
    means for receiving a plurality of power control bits, wherein a set of said plurality of power control bits indicates that the transmission power should be increased by a predetermined amount, and wherein another set of said plurality of power control bits indicates that the transmission power should be increased by an amount which is greater than said predetermined amount;
    means for increasing the transmission power by said predetermined amount in response to receiving said set of said plurality of power control bits; and,
    means for increasing the transmission power by said amount which is greater than said predetermined amount in response to receiving said another set of said plurality of power control bits.

12. A system for controlling transmission power of a mobile unit according to claim 11 wherein a third set of said plurality of power control bits indicates that the transmission power should be decreased by said predetermined amount, wherein a fourth set of said plurality of power control bits indicates that the transmission power should be decreased by said amount which is greater than said predetermined amount; and wherein said mobile unit further includes:
  means for decreasing the transmission power by said predetermined amount in response to receiving said third set of said plurality of power control bits; and,
  means for decreasing the transmission power by said amount which is greater than said predetermined amount in response to receiving said fourth set of said plurality of power control bits.

13. A system for controlling transmission power of a mobile unit according to claim 11, said mobile unit further comprising a Differential Quadriture Phase Shift Keying detector coupled to said means for receiving.

14. An apparatus for controlling transmission power of a mobile unit in a wireless communication system comprising:
  a receiver configured to receive a plurality of power control bits;
  a Differential Quadriture Phase Shift Keying detector coupled to said receiver;
  a demodulator coupled to said receiver;
  a demultiplexor coupled to said demodulator, configured to separate a plurality of power control bits from said transmit power control signals;
  a processor coupled to said demultiplexor; configured to determine if a set of power control bits indicates one of increasing the transmission power by a predetermined amount, increasing the transmission power by an amount which is larger than said predetermined amount, decreasing the transmission power by said predetermined amount, and decreasing the transmission power by said amount which is greater than said predetermined amount.

15. An apparatus according to claim 14 wherein said processor is further configured to:
  increase the transmission power by said predetermined amount if it determines that said set of power control bits indicates a request to increase the transmission power by said predetermined amount;
  increase the transmission power by said amount which is greater than said predetermined amount if it determines that said set of power control bits indicates a request to increase the transmission power by said amount which is greater than said predetermined amount;
  decrease the transmission power by said predetermined amount if it determines that said set of power control bits indicates a request to decrease the transmission power by said predetermined amount; and,
  decrease the transmission power by said amount which is greater than said predetermined amount if it determines that said set of power control bits indicates a request to decrease the transmission power by said amount which is greater than said predetermined amount.

16. An apparatus for controlling transmission power of a mobile unit in a wireless communication system comprising:
  a base station including:
    a transmitter configured to transmit sets of a plurality of power control bits;
    a Differential Quadriture Phase Shift Keying modulator coupled to said transmitter;
    wherein a first set of said plurality of power control bits indicates a request to increase the transmission power by a predetermined amount;
    wherein a second set of said plurality of power control bits indicates a request to increase the transmission power by an amount which is greater than said predetermined amount;
    wherein a third set of said plurality of power control bits indicates a request to decrease the transmission power by said predetermined amount; and,
    wherein a fourth set of said plurality of power control bits indicates a request to decrease the transmission power by an amount which is greater than said predetermined amount.

17. An apparatus according to claim 16 wherein said sets of said plurality of power control bits each include two bits.

18. An apparatus according to claim 16 wherein said Differential Quadriture Phase Shift Keying modulator is configured to modulate said plurality of power control bits using $\pi/4$ Differential Quadriture Phase Shift Keying modulation.

19. wireless mobile unit comprising:
  an antenna;
  a receiver coupled to the antenna and configured to receive a plurality of power control bits;
  a transmitter coupled to the antenna;
  wherein the mobile unit is capable of increasing the transmit power of the transmitter by a predetermined amount in response to receipt of one set of the plurality of power control bits; and wherein the mobile unit is capable of increasing the transmit power of the transmitter by an amount that is larger than the predetermined amount in response to receipt of another set of the plurality of power control bits.

20. The wireless mobile unit of claim 19, wherein:

said one set of the plurality of power control bits comprises two bits; and said another set of the plurality of power control bits comprises two bits.

21. The wireless mobile unit of claim 20, wherein:

the predetermined amount is 0.25 dB; and the amount that is larger than the predetermined amount is 1.5 dB.

22. The wireless mobile unit of claim 19, wherein:

the wireless mobile unit is capable of decreasing the transmit power of the transmitter by the predetermined amount in response to a third set of the plurality of power control bits; and the wireless mobile unit is capable of decreasing the transmit power of the transmitter by the amount that is larger than the predetermined amount in response to a fourth set of the plurality of power control bits.

23. The wireless mobile unit of claim 19, wherein the plurality of power control bits are received over a Differential Quadrature Phase Shift Keying modulated subchannel.

* * * * *